(12) United States Patent
Lu et al.

(10) Patent No.: US 11,728,847 B2
(45) Date of Patent: *Aug. 15, 2023

(54) VARIABLE-Q ANTENNA COIL CIRCUIT FOR RFID APPLICATIONS

(71) Applicant: Avid Identification Systems, Inc., Norco, CA (US)

(72) Inventors: Gui-Yang Lu, Upland, CA (US); Peter Troesch, Laguna Niguel, CA (US)

(73) Assignee: AVID Identification Systems, Inc., Norco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,005

(22) Filed: Oct. 16, 2020

(65) Prior Publication Data

US 2021/0281292 A1  Sep. 9, 2021

Related U.S. Application Data

(63) Continuation of application No. 16/811,374, filed on Mar. 6, 2020, now Pat. No. 10,812,148.

(51) Int. Cl.
*H04B 5/00* (2006.01)
*H01Q 1/22* (2006.01)
*H01Q 7/00* (2006.01)

(52) U.S. Cl.
CPC ......... *H04B 5/0062* (2013.01); *H01Q 1/2208* (2013.01); *H01Q 7/00* (2013.01); *H04B 5/0081* (2013.01)

(58) Field of Classification Search
None
See application file for complete search history.

(56) References Cited

U.S. PATENT DOCUMENTS

| | | | | |
|---|---|---|---|---|
| 3,023,621 A | * | 3/1962 | Smith | G01R 19/00 331/66 |
| 3,582,799 A | * | 6/1971 | Reid | H03D 3/04 327/100 |
| 5,331,299 A | * | 7/1994 | Smith | H03H 11/04 333/17.1 |
| 6,091,125 A | * | 7/2000 | Zavracky | H01H 59/0009 257/417 |

(Continued)

FOREIGN PATENT DOCUMENTS

| | | | |
|---|---|---|---|
| CN | 104332710 A | * | 2/2015 |
| CN | 106154015 A | * | 11/2016 |
| WO | WO-2011041849 A1 | * | 4/2011 ........... G06K 7/0008 |

OTHER PUBLICATIONS

Makarov et al., Practical Electrical Engineering, Second Edition, Chapter 10 (Year: 2019).*

(Continued)

*Primary Examiner* — Mohammed Rachedine
(74) *Attorney, Agent, or Firm* — Fish & Richardson P.C.

(57) ABSTRACT

A passive radio frequency identification (RFID) reader is configured to dynamically vary the Q factor of its resonant antenna coil circuit in order to optimize its performance under different conditions. This RFID reader suitably provides optimal performance for both transponder reading and transponder writing operations, rather than being designed for optimal performance for only one operation or the other, or some fixed compromise between them.

17 Claims, 7 Drawing Sheets

(56) References Cited

U.S. PATENT DOCUMENTS

| | | | |
|---|---|---|---|
| 10,812,148 B1 | 10/2020 | Lu et al. | |
| 2007/0008131 A1* | 1/2007 | Doan | G06K 17/0029 |
| | | | 340/572.1 |
| 2011/0018535 A1* | 1/2011 | Rudakov | G01R 33/441 |
| | | | 324/303 |
| 2012/0223782 A1* | 9/2012 | Hirama | H03B 5/1237 |
| | | | 331/108 R |
| 2013/0281016 A1* | 10/2013 | McFarthing | H04B 5/02 |
| | | | 455/41.1 |
| 2015/0109057 A1* | 4/2015 | Rouat | H03G 1/0088 |
| | | | 330/254 |
| 2017/0013685 A1* | 1/2017 | Himeda | H05B 47/16 |
| 2017/0170878 A1* | 6/2017 | Cho | G06K 7/10148 |
| 2018/0367187 A1 | 12/2018 | McFarthing | |

OTHER PUBLICATIONS

International Search Report and Written Opinion in International Appln. No. PCT/US2021/021129, dated Jul. 1, 2021, 15 pages.

Makarov et al., "Practical Electrical Engineering, Second Edition," Springer, ISBN 978-3-319-96692-2, 2019, 674 pages.

\* cited by examiner

VARIABLE-Q ANTENNA COIL CIRCUIT FOR RFID APPLICATIONS

CROSS-REFERENCE TO RELATED APPLICATION

This application is a continuation of and claims priority to U.S. patent application Ser. No. 16/811,374, filed on Mar. 6, 2020. The disclosure of the prior application is considered part of and are incorporated by reference in the disclosure of this application.

BACKGROUND

This specification relates to Radio Frequency Identification (RFID) systems, and in particular to magnetically-coupled passive RFID systems.

As shown in FIG. 1, a passive RFID system 10 typically includes two major subassemblies: a reader 11, and a transponder 12 which is to be read at some distance from the reader 11. The reader 11 includes an AC voltage source that drives its resonant antenna coil circuit. In this manner, the reader 11 emits an alternating magnetic field from its antenna coil, which is weakly magnetically coupled (represented in FIG. 1 by a dashed double arrow) to a corresponding antenna coil in the transponder 12 to be read. Each of these antenna coils is part of a corresponding antenna coil circuit which includes one or more tuning capacitors to cause it to resonate at a desired frequency, with a Q factor that is limited to some maximum value primarily by the DC resistance of its antenna coil windings.

The transponder 12 obtains its operating power from the reader's emitted magnetic field, and modulates (e.g., using a switch and loading resistor) the Q factor and/or resonant frequency of its antenna coil circuit in a pattern corresponding to any information which is to be sent from the transponder 12 to the reader 11. This information commonly includes an identification number which uniquely corresponds to the individual transponder.

SUMMARY

This specification describes a reader having the ability to dynamically adjust the Q factor of its resonant antenna coil circuit in order to improve (e.g., optimize) its performance for either reading transponders at long ranges, or for both reading and writing transponders at shorter ranges.

In order to dynamically adjust the Q factor, we add a variable resistance element to the reader's antenna coil circuit, under the control of a controller (e.g., integrated circuit based controller) within the reader. The reader's controller may adjust this variable resistance element to its smallest value (e.g., zero ohms) for best read-only performance, or dynamically adjust it to a larger resistance to reduce the Q factor of its resonant antenna coil circuit in order to perform writing operations.

In general, one innovative aspect of the subject matter described in this specification can be embodied in circuitry for communicating with an RFID transponder. The circuitry includes: an antenna coil circuit having an inductance, a capacitance, and a resistance determining a natural resonant frequency and Q factor for the antenna coil circuit, the antenna coil circuit including a variable resistive element; an AC voltage source configured to drive the antenna coil circuit at or near the antenna coil circuit's natural resonant frequency; a receiving subsystem to receive information from the RFID transponder; and a controller in communication with the antenna coil circuit and the AC voltage source, the controller being programmed to modulate the AC voltage source to send information to the RFID transponder and to control the variable resistive element.

The foregoing and other embodiments can each optionally include one or more of the following features, alone or in combination. In particular, one embodiment includes all the following features in combination.

In some implementations, the antenna coil circuit includes one or more inductive elements. The antenna coil circuit can include one or more capacitive elements.

The controller can be programmed to modulate the AC voltage source by turning the AC voltage source on and off.

During operation of the circuitry, the controller can vary a resistance of the variable resistive element to vary a Q factor of the antenna coil circuit.

The Q factor can be varied between two or more values in a range from 1 to 500 (e.g., in a range from 200 to 300).

The variable resistive element can be an electronically-controlled variable resistive element.

The variable resistive element can be a mechanically-controlled variable resistive element.

The circuitry can include a user interface for controlling the variable resistive element.

The controller can be programmed to automatically control the variable resistive element.

The variable resistive element can be continuously variable over a range of resistance values.

The variable resistive element can be variable between two or more discrete resistance values. The variable resistive element can include a resistor having a specified fixed resistance and a switching element configured, in one state, to short the resistor.

The variable resistive element can be electrically connected between two nodes of the antenna circuit which, during operation of the circuitry, experience lower voltage swings than other nodes of the antenna circuit with respect to a circuit node of interest.

The controller can be programmed to vary a resistance of the variable resistive while the AC voltage source is turned on and driving the antenna coil circuit.

The controller can be programmed to vary a resistance of the variable resistive while the AC voltage source is turned off and not driving the antenna coil circuit.

The subject matter described in this specification can be implemented in particular embodiments to realize one or more of the following advantages. The disclosed technologies can allow for a single RFID reader to dynamically reconfigure itself for different operations over different ranges, such as long range read-only operations, shorter range read/write operations, or some compromise between read-only vs. read/write operations. An RFID reader which does not incorporate the disclosed technologies can sacrifice maximum read-only range in order to support read/write operations.

Furthermore, an RFID reader incorporating the disclosed technologies may dynamically adjust the Q factor used for read/write operations to optimize its operation for varying external conditions. For example, it may reduce this Q factor if only very short range read/write operations are necessary (e.g., at a range of a few centimeters), or increase this Q factor to support a longer read/write range. The dynamic adjustment can be performed while the reader and transponder are in communication with each other.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
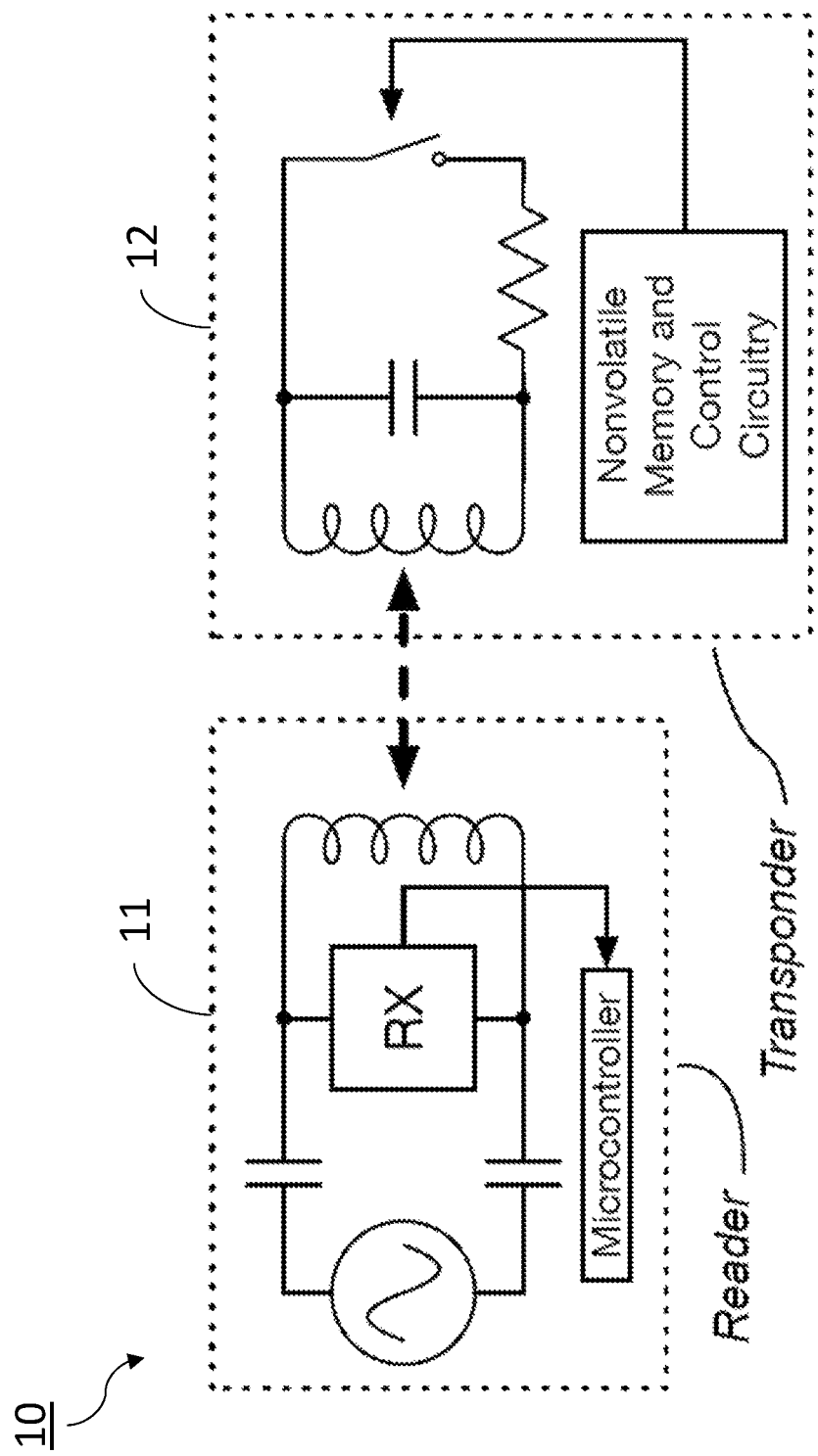
FIG. 1 is a schematic diagram of a conventional passive RFID system.

Technologies for improving (e.g., optimizing) performance of an RFID reader for long range read-only operation, shorter range read/write operation, or a compromise between the two are described in this specification.

An RFID reader drives its resonant antenna coil circuit with an AC voltage source, which produces an alternating voltage waveform such as a sinusoid or square wave. This results in a predominantly sinusoidal current waveform in the reader's antenna coil, which creates an alternating magnetic field in a volume of space around the reader's antenna coil.

Due to the magnetic coupling between a reader and a transponder, the transponder's modulation appears as variations in the electrical currents and voltages present in the reader's antenna coil circuit. The reader can then use a receiving subsystem (represented by RX in FIG. 1) to detect and demodulate these variations in order to retrieve whatever information the transponder sends. This receiving subsystem typically includes an amplitude modulation detector and one or more filtering and/or gain stages. Maximum reading range is achieved when both the reader's antenna coil circuit and the transponder's antenna coil circuit are tuned to resonate at the frequency of the reader's AC voltage source, both antenna coils are oriented for optimal magnetic coupling, both antenna coil circuits have the highest practical Q factors, and the transponder modulates its Q factor as deeply as practical while still receiving enough power from the reader for its circuitry to operate.

The information present in a transponder is typically stored in some form of nonvolatile memory. This memory may include a combination of factory-programmed and/or field-programmable memory locations. Some transponders may also generate and/or store dynamic information, such as a temperature transducer reading. Typically, the transponder will automatically send a subset of its stored information when it is activated by the magnetic field emitted from a nearby reader.

Some transponders are not only readable, but are also writable. A compatible reader can modulate its own emitted alternating magnetic field (e.g., by turning on and off the AC voltage source driving its resonant antenna coil circuit) in order to send commands and/or data to one of these transponders. This function is called "writing", as opposed to the previously described function of "reading". A device which performs both reading and writing functions is still generically referred to as a "reader". Transponder writing may be used for purposes such as commanding the transponder to send a different collection of information than it automatically sends by default, for initial programming of the transponder at time of manufacture, for programming field-programmable memory locations, or for activating special transponder functions.

When the reader turns on or off the AC voltage source driving its resonant antenna coil circuit, it takes time for the envelope of the alternating current in the coil (and thus, the magnitude of the emitted magnetic field) to correspondingly grow or decay. The time constant of the growth or decay is determined by the Q factor of the circuit. The highest practical Q factor is generally desirable for best reading range, but this can make writing to the transponder impossible when the time constant is long with respect to the periods of bits to be written.

Figure 2:
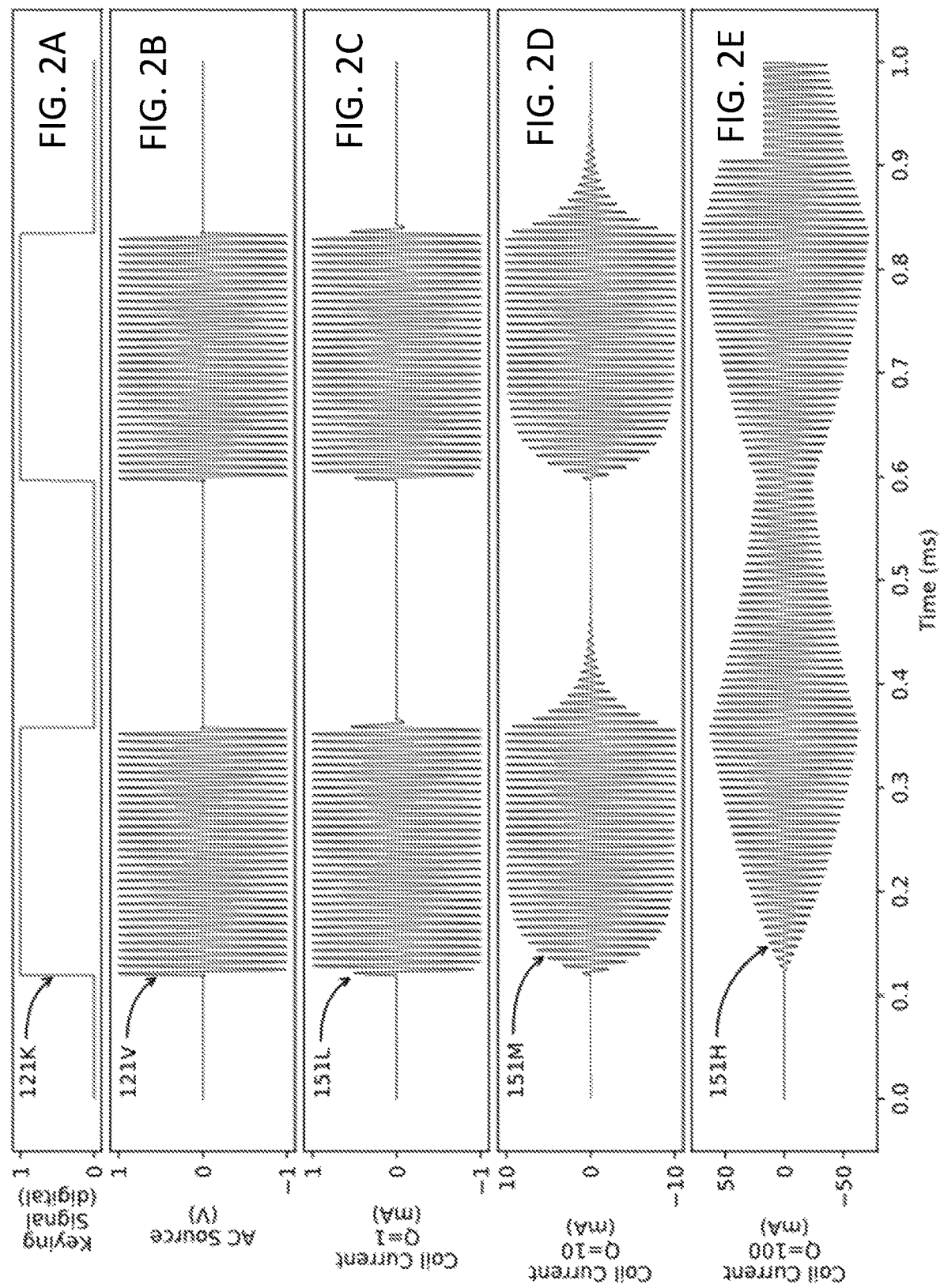
FIGS. 2A-2E show signals that highlight the effect of changing the Q factor of the reader's resonant antenna coil circuit in accordance with the disclosed technologies.

This is illustrated in FIG. 2A through FIG. 2E. Here, FIG. 2B shows an example voltage signal of the AC voltage source, in which the AC voltage source is turned on and off by the keying signal in FIG. 2A. This example has a bit period of 32 cycles, but more generally other bit periods are possible. FIG. 2C through FIG. 2E show the corresponding antenna coil currents (and thus, the emitted alternating magnetic field strengths) with three different Q factors of the resonant antenna coil circuit. These three Q factors, as well as all other specific Q factors described in this specification, are illustrative examples; in practice, Q factors outside this range may be used.

The low Q factor of 1 in FIG. 2C results in a very well-formed envelope, with a low peak current magnitude. In other words, the modulated envelope of the emitted alternating magnetic field is very clean, with sharp edges, but it is not very strong. This can result in reliable writing operations at very short range, but little to no ability to read or write transponders at longer ranges.

The much higher Q factor of 100 in FIG. 2E results in a much higher peak coil current magnitude, with slow growth and decay. In this example, the time constant of the growth and decay are much longer than the bit period. In other words, this will allow reading a transponder at long range, but it generally prevents writing operations. The Q factor shown in FIG. 2E is an illustrative example; in any given practical implementation, a designer may choose to use a lower or higher Q factor based on a variety of factors.

An intermediate Q factor of 10 in FIG. 2D is a compromise which provides a stronger emitted alternating magnetic field than FIG. 2C, while still providing clean enough modulation for writing operations to succeed over a span of ranges. Neither reading nor writing will succeed at the maximum reading range supported in FIG. 2E, but both reading and writing can succeed at a longer range than is supported in FIG. 2C. FIGS. 2A-2E are discussed in more detail below.

While the intermediate Q factor of 10 in FIG. 2D is a compromise, it is not the only possible compromise, nor is it the best compromise for all conditions. To understand this, consider how a transponder will demodulate the alternating magnetic field corresponding to the current signal in FIG.

Figure 3:
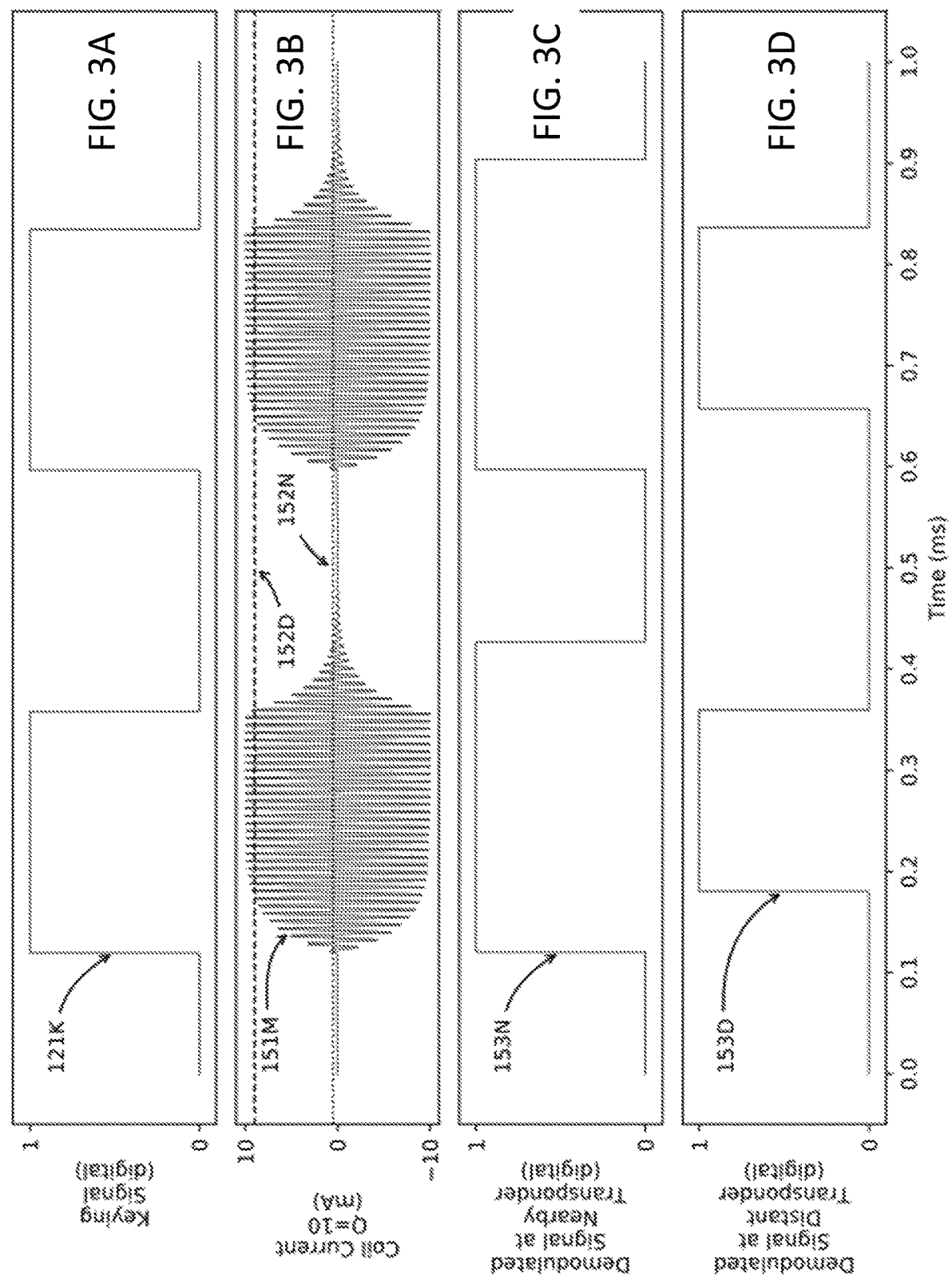
FIGS. 3A-3D show signals that highlight the effect of an intermediate Q factor value on a transponder's ability to demodulate commands and data written to it from the reader.

2D at different ranges from the reader. This is illustrated in FIG. 3A through FIG. 3D. FIG. 3A shows the same keying signal as FIG. 2A, and FIG. 3B shows the same reader coil current signal as FIG. 2D.

A transponder which is very near to the reader will be much more strongly coupled to the reader's antenna coil circuit than it would be if it was distant from the reader. This corresponds to a large variation in the magnitude of current which the reader's emitted alternating magnetic field induces in the transponder's coil. There is naturally some minimum threshold of alternating magnetic field strength present at the transponder, below which the transponder can no longer detect that the alternating magnetic field emitted by the reader is present. This is represented in FIG. 3B by two horizontal lines. The dotted line represents the minimum magnitude of reader antenna coil current which is detectable by a transponder very near to the reader, while the dashed line represents the minimum magnitude of reader antenna coil current which is detectable by a transponder at a much greater distance from the reader.

The signal of FIG. 3C represents how a transponder very near to the reader might demodulate the emitted magnetic field corresponding to the reader coil current signal of FIG. 3B. Being very close to the reader, the transponder detects both the cycles of alternating magnetic field generated while the keying signal is high, and the additional cycles corresponding to ringing of the reader's resonant antenna coil circuit after the keying signal goes low. This results in a distorted reproduction of the original keying signal of FIG. 3A, with longer high periods and shorter low periods.

The signal of FIG. 3D represents how a transponder distant from the reader might demodulate the emitted magnetic field corresponding to the reader coil current signal of FIG. 3B. Being far from the reader, the transponder fails to detect the first several cycles of alternating magnetic field generated while the keying signal is high, and does not detect the ringing of the reader's resonant antenna coil circuit after the keying signal goes low. This results in a distorted reproduction of the original keying signal of FIG. 3A, with shorter high periods and longer low periods.

While a well-designed transponder should be able to tolerate some degree of distortion of the demodulated signal it detects from the reader, any particular Q factor might cause enough distortion of the demodulated signal to prevent correct demodulation by a transponder which is either too close to or too far from the reader.

To further illustrate how changing the Q factor of the reader's resonant antenna coil circuit can affect a transponder's ability to demodulate commands and data sent to it from the reader, FIG. 4A through FIG. 4D and FIG. 5A through FIG. 5D apply the analysis and thresholds of FIG. 3A through FIG. 3D to the higher and lower Q factors of FIG. 2E and FIG. 2C, respectively.

Figure 4:
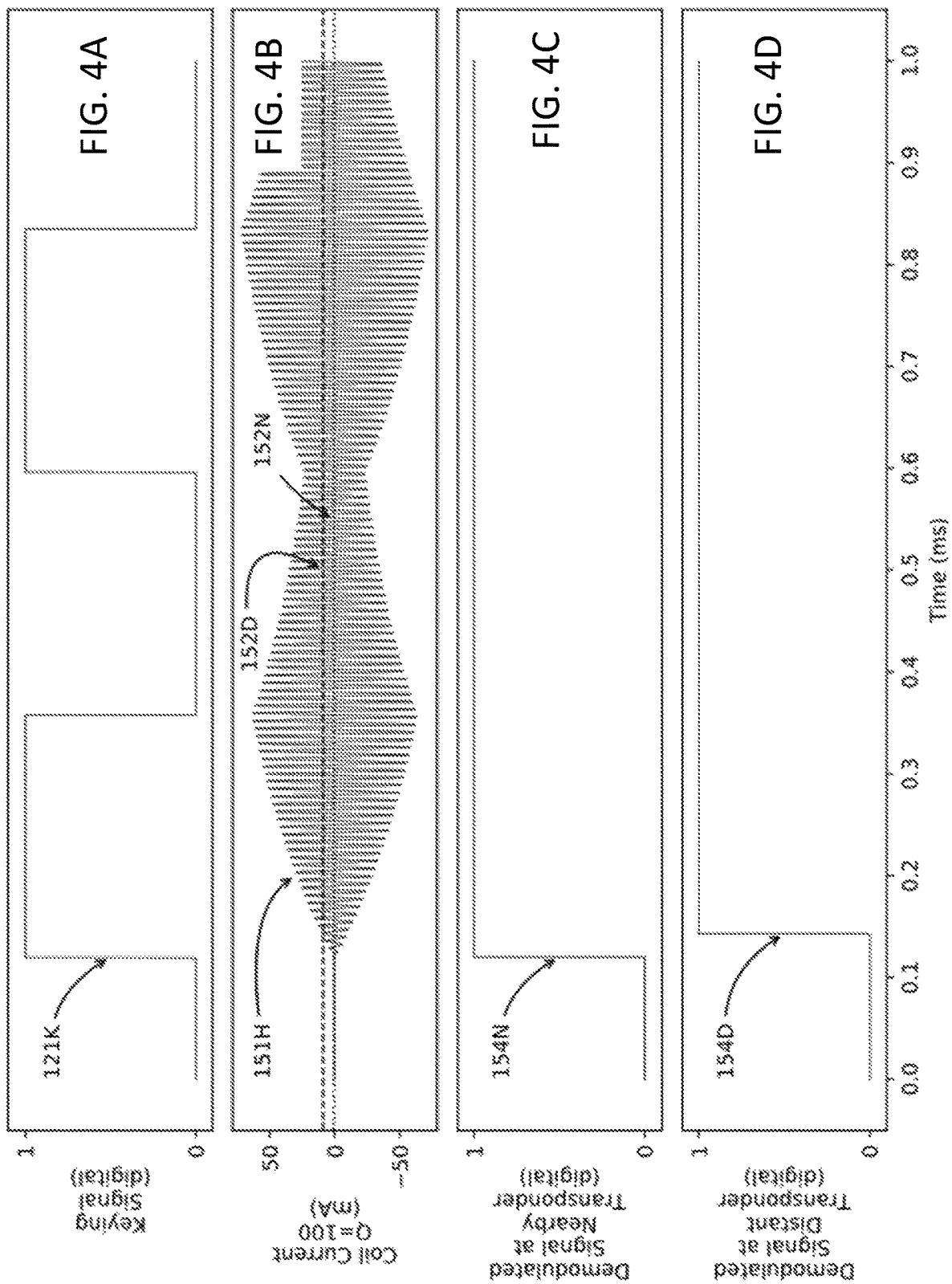
FIGS. 4A-4D show signals that highlight the effect of a high Q factor value on a transponder's ability to demodulate commands and data written to it from the reader.

FIG. 4A shows the same keying signal as FIG. 2A and FIG. 3A. FIG. 4B shows the high-Q current waveform of FIG. 2E with the thresholds of FIG. 3B added. FIG. 4C and FIG. 4D show that at either of the two ranges selected for this analysis, the transponder is not able to properly reconstruct the original keying signal. It is apparent that there might be some longer distance at which a transponder could correctly reconstruct the original keying signal, but there would be a zone near the reader in which writing to the transponder would fail.

Figure 5:
FIGS. 5A-5D show signals that highlight the effect of a low Q factor value on a transponder's ability to demodulate commands and data written to it from the reader.

FIG. 5A shows the same keying signal as FIG. 2A and FIG. 3A. FIG. 5B shows the low-Q current waveform of FIG. 2C with the thresholds of FIG. 3B added. FIG. 5C shows that a nearby transponder might reconstruct the original keying signal with very little distortion, while a more distant transponder fails to detect the reader's alternating magnetic field at all.

Thus, if a reader should be able to read transponders at the longest practical ranges but also support writing to transponders at necessarily shorter ranges, then the reader should be able to adjust the Q factor of its resonant antenna coil circuit in order to configure itself for either long-range read-only operations or shorter-range read/write operations. Furthermore, a single lower value of Q factor may not be suitable for all conditions; the reader might need to dynamically adjust its Q factor. A reader can adjust the Q factor value that it uses for read/write operations based on some user input, such as a user-alterable configuration setting. Or, it can automatically adjust it dynamically, such as by trying different Q factor values in rapid succession until a transponder correctly responds to a command sent by the reader. Ideally, the reader should be able to dynamically adjust its Q factor between two or more values while its resonant antenna coil circuit is being driven, so that it can rapidly make adjustments without first waiting for antenna coil circuit oscillations to decay.

Figure 6:
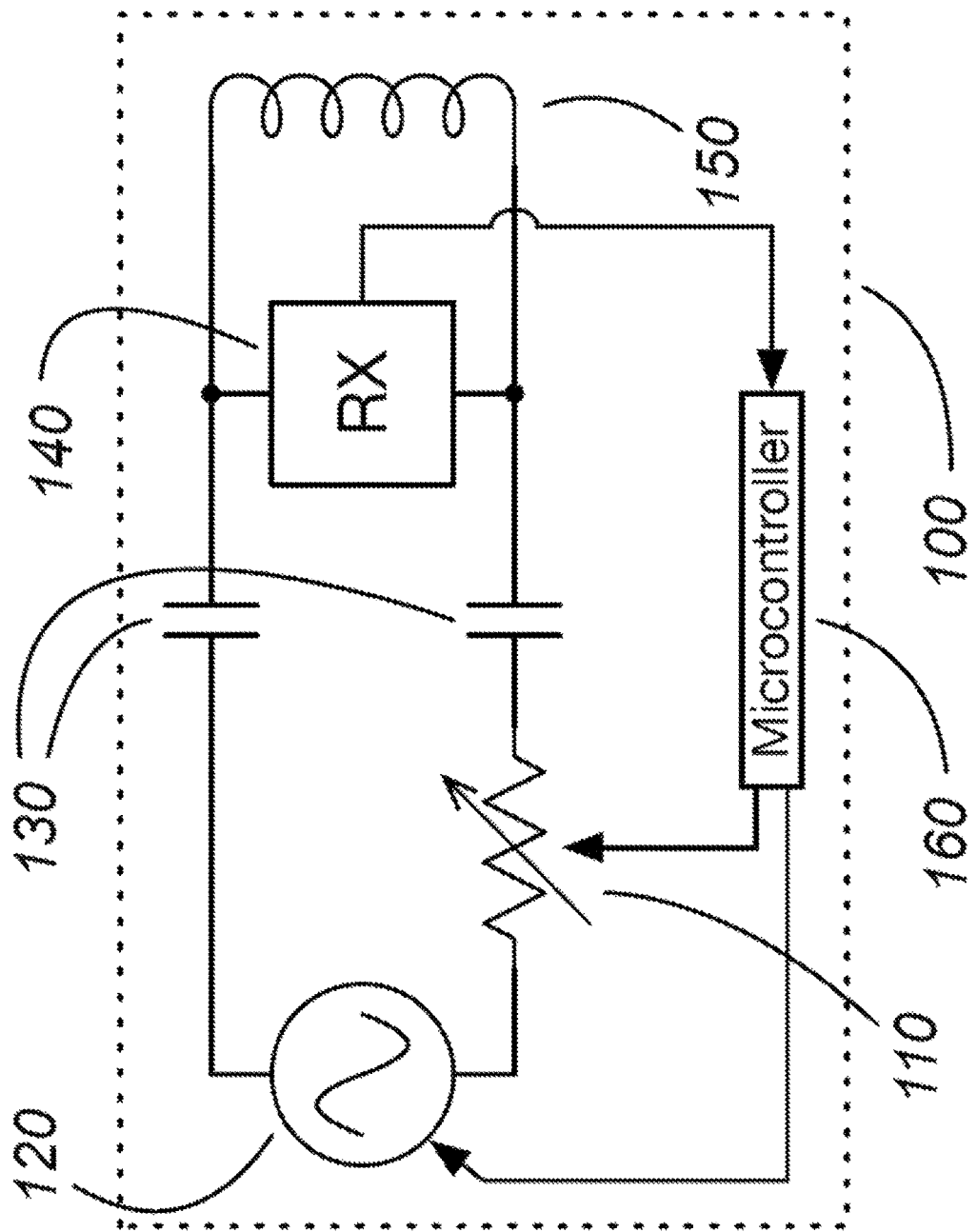
FIG. 6 is a schematic diagram of a passive RFID reader that incorporates a variable Q antenna coil circuit with a first example of a variable resistance element.

FIG. 6 is a schematic diagram of a passive RFID reader 100 that incorporates a variable-Q antenna coil circuit with a first example of a variable resistance element 110. The passive RFID reader 100 includes an AC voltage source 120, which drives a resonant antenna coil circuit at or near its natural resonant frequency. The resonant antenna coil circuit includes one or more capacitors 130 and antenna coil 150, and it has a natural maximum Q factor determined primarily by the DC resistance of antenna coil 150.

In use, antenna coil 150 is loosely magnetically coupled to a similar resonant antenna coil circuit in a passive RFID transponder to be read, e.g., like the one shown in FIG. 1. The passive RFID transponder includes a capability to vary its coupling with reader, typically by varying the Q factor and/or resonant frequency of its antenna coil circuit, in order to send information from the transponder to the reader. A typical method comprises a switching element and loading resistor, which allow the transponder to modulate the Q factor of its own resonant antenna coil circuit. This modulation causes variations in the voltages and currents present in the reader's resonant antenna coil circuit, which are detected by the reader's receiving subsystem 140. The output of receiving subsystem 140 is interpreted by a controller 160 (also referred to as a microcontroller) for display and/or interface with other devices.

The variable resistance 110 allows controller 160 to vary the Q factor of the reader's resonant antenna coil circuit as needed. To read data from a transponder at maximum range, controller 160 sets variable resistance 110 to its minimum value. However, when the reader must write data to a transponder, controller 160 increases the resistance of the variable resistance element 110 to lower the Q factor of the reader's resonant antenna coil circuit from its natural maximum value, and then turns AC voltage source 120 on and off in order to modulate the alternating magnetic field emitted by coil 150. The reader may also read from the transponder in this configuration, with reduced maximum range.

In some implementations, the variable resistance element 110 includes a continuously variable resistance element having a resistance range. Here, controller 160 is configured to set any appropriate resistance value in the resistance range.

In some implementations, the variable resistance element 110 includes a resistance element that is settable to any of a group of discrete resistance values. Here, controller 160 is configured to set any of the group of discrete resistance values. One such example, in which the resistance element is settable to either of two resistance values is described below.

Figure 7:
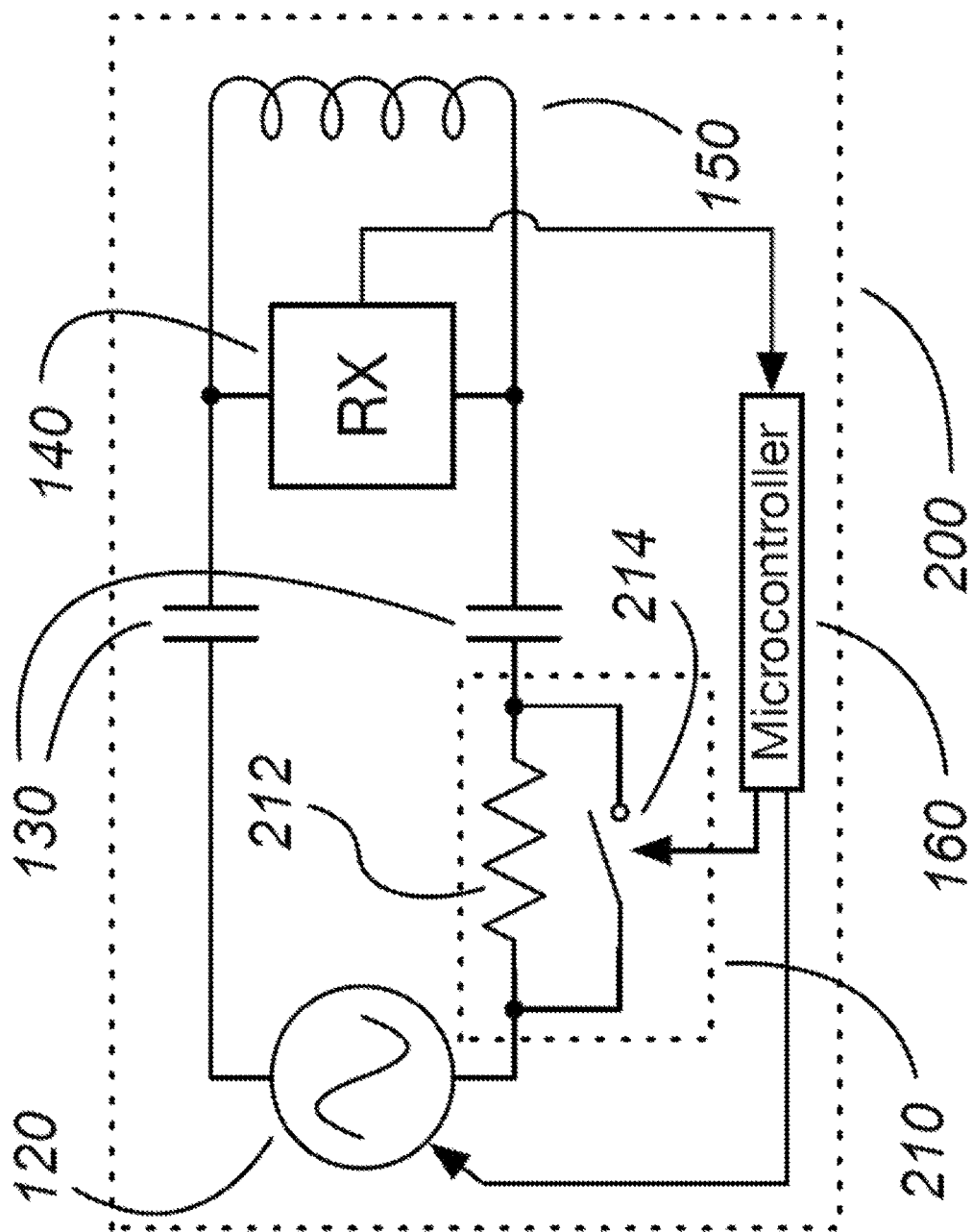
FIG. 7 is a schematic diagram of a passive RFID reader that incorporates a variable Q antenna coil circuit with a second example of a variable resistance element.

FIG. 7 is a schematic diagram of a passive RFID reader 200 that incorporates a variable-Q resonant antenna coil circuit with a second example of a variable resistance element 210. Except for the variable resistance element 210, the passive RFID reader 200 has the same components as the passive RFID reader 100. Here, the variable resistance element 210 includes a fixed resistance element 212, and switching element 214 connected in parallel to the fixed resistance element 212. Opening or closing switching element 214 allows variable resistance element 212 to present either of two resistance values to the reader 200's resonant antenna coil circuit, resulting in either of two Q factors to be selected for the reader 200's resonant antenna coil circuit. For instance, controller 160 may close switching element 214, thus shorting the fixed resistance element 212 from the resonant antenna coil circuit, and selecting a high Q factor configuration. Alternatively, controller 160 may open switching element 214, thus allowing fixed resistance element 212 to reduce the Q factor of the resonant antenna coil circuit.

In some implementations, the switching element 214 can be implemented as one or more transistors. In some implementations, the switching element 214 can be implemented as an opto-isolator.

In implementations which use a series-resonant antenna coil circuit, one or both circuit nodes of the antenna coil may experience large voltage swings with respect to some other reference node, such as the system ground. These voltage swings commonly exceed 1,000 volts with respect to system ground in practical reader designs. The variable resistance element can have the same effect upon the resonant antenna circuit's Q factor if it is placed between any two consecutive nodes of the series-resonant circuit. However, it can be beneficial to place it between two consecutive nodes which each experience smaller voltage swings, such as between the AC voltage source and one of the antenna circuit's reactive elements. This can reduce (e.g., minimize) the voltage stresses upon the variable resistance element and its controlling circuitry.

In light of the two example circuits described above, it is instructive to again review FIGS. 2A-2E, which show signals that highlight the effect of changing the antenna coil circuit's Q factor in accordance with the disclosed technologies. Again, FIG. 2A shows a digital keying signal 121K which turns AC voltage source 120 on and off. FIG. 2B shows an example of a voltage signal 121V produced by the AC voltage source 120. In this example, AC voltage source 120 generates a 134.2 kHz sinusoidal signal while turned on by keying signal 121K, and keying signal 121K has high and low bit periods equal to N=32 cycles of AC voltage source 120. FIG. 2C shows a first signal 151L corresponding to current in the reader 100 or 200's antenna coil circuit with a low Q factor equal to 1. FIG. 2D shows a second signal 151M corresponding to current in the reader 100 or 200's antenna coil circuit with an intermediate Q factor equal to 10. FIG. 2E shows a third signal 151H corresponding to current in the reader 100 or 200's antenna coil circuit with a high Q factor equal to 100. Note that each of the signals 151L, 151M, and 151H has a different vertical scale. Referring now to the example of antenna coil circuit with Q=1, the antenna coil current 151L shows clean on/off keying, but its magnitude (and thus the emitted magnetic field magnitude) is small, here about 1 mA, as shown in FIG. 2C. Referring now to the example of antenna coil circuit with Q=100, the magnitude of the antenna coil current 151H is much larger, here about 60 mA, but it builds up slowly and continues ringing for a long time after the AC drive 121 is removed, as shown in FIG. 2E. Referring now to the example of antenna coil circuit with Q=10, the antenna coil current 151M represents a compromise between magnitude and distortion of the modulated envelope, as shown in FIG. 2D. Here, the magnitude of the antenna coil current 151M is about 10 mA.

In summary, this specification describes a passive RFID reader configured to dynamically vary the Q factor of its resonant antenna coil circuit in order to optimize its performance for transponder reading and transponder writing operations at shorter ranges, only transponder reading operations at longer ranges, or some compromise between the two, rather than being designed for a single compromise between read-only vs. read/write operations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "controller" refers to electronic control and/or data processing hardware and encompasses all kinds of apparatus, devices, and machines for processing data, including by way of example a programmable processor, a computer, or multiple processors or computers. The controller can also be, or further include, special purpose logic circuitry, e.g., an FPGA (field programmable gate array) or an ASIC (application-specific integrated circuit). The controller can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more processing units executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented using a computer having a display device, e.g., an OLED (organic light emitting diode) display or LCD (liquid crystal display) display, for displaying information to the user and a keyboard and a pointing device, e.g., a mouse or a touch panel, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Other embodiments are in the following claims.

What is claimed is:

1. A method for communicating with a radio frequency identification (RFID) transponder using a RFID circuit comprising a resonant antenna coil circuit having a Q factor, the method comprising:
    during a read-only mode of an RFID circuit in which the RFID circuit performs no write operations to the transponder and the resonant antenna coil circuit operates at a first value for the Q factor, receiving at the RFID circuit a signal from the transponder, wherein the RFID circuit dynamically adjusts the Q factor of the resonant antenna coil circuit from the first value to the second value in response to a user's input into the RFID circuit;
    upon receipt of the signal from the transponder, varying the Q factor from the first value to a second value lower than the first value to switch the RFID circuit from the read-only mode to a read/write mode; and
    during the read/write mode of the RFID circuit in which the RFID circuit performs write operations to the transponder and the resonant coil circuit operates at the second value for the Q factor, receiving at the RFID circuit a signal from the transponder and transmitting from the RFID circuit a signal to the transponder,
    wherein the second value for the Q factor is selected so that a time constant of a magnetic field envelope associated with the signal transmitted from the RFID circuit is shorter than a bit period associated with data in the signal.

2. The method of claim 1, wherein the resonant antenna coil circuit comprises an inductance, a capacitance, and a resistance determining the Q factor for the antenna coil circuit.

3. The method of claim 2, wherein the resonant antenna coil circuit comprises a variable resistor and the resistance of the resonant antenna coil circuit is varied by varying a resistance of the variable resistor.

4. The method of claim 2, wherein the resistance is varied electronically.

5. The method of claim 2, wherein the resistance is varied mechanically.

6. The method of claim 1, further comprising positioning the RFID circuit closer to the RFID transponder while operating the RFID circuit in the read/write mode than when operating the RFID circuit in the read-only mode.

7. The method of claim 1, wherein the RFID circuit transmits command signals at a plurality of different values for the Q factor of the resonant antenna circuit and selects the second value based on a response of the RFID transponder to the command signals.

8. The method of claim 1, wherein the Q factor is adjusted while the while driving the resonant antenna circuit.

9. The method of claim 1, wherein the resonant antenna circuit is driven with an AC voltage source.

10. The method of claim 1, wherein the signal from the transponder received at the RFID circuit while operating the resonant antenna coil circuit at the first value for the Q factor comprising information stored in non-volatile memory on the transponder.

11. The method of claim 10, wherein the information stored in non-volatile memory on the transponder comprises an identification number which uniquely corresponds to the transponder.

12. The method of claim 1, wherein the signal transmitted from the RFID circuit while operating the resonant antenna coil circuit at the second value for the Q factor comprises information selected from the group consisting of information commanding the transponder to send information different than the information the transponder automatically sends by default, information for initial programming of the transponder, information for programming field-programmable memory locations of the transponder, and information for activating a transponder function.

13. The method of claim 1, wherein transmitting from the RFID circuit a signal to the transponder comprising driving the resonant antenna coil at or near a natural resonant frequency of the resonant antenna coil.

14. The method of claim 13, wherein an AC voltage source that drives the resonant antenna coil is turned off when the Q factor is varied.

15. The method of claim 13, wherein an AC voltage source that drives the resonant antenna coil is turned on when the Q factor is varied.

16. The method of claim 1, wherein the Q factor is varied continuously from the first value to the second value.

17. A non-transitory computer readable medium containing program instructions for communicating with a radio frequency identification (RFID) transponder using a RFID circuit comprising a resonant antenna coil circuit having a Q factor, wherein execution of the program instructions by one or more processors of a computer system causes the one or more processors to carry out the steps of:

during a read-only mode of an RFID circuit in which the RFID circuit performs no write operations to the transponder and the resonant antenna coil circuit operates at a first value for the Q factor, receiving at the RFID circuit a signal from the transponder, wherein the RFID circuit dynamically adjusts the Q factor of the resonant antenna coil circuit from the first value to the second value in response to a user's input into the RFID circuit;

upon receipt of the signal from the transponder, varying the Q factor from the first value to a second value lower than the first value to switch the RFID circuit from the read-only mode to a read/write mode; and during the read/write mode of the RFID circuit in which the RFID circuit performs write operations to the transponder and the resonant coil circuit operates at the second value for the Q factor, receiving at the RFID circuit a signal from the transponder and transmitting from the RFID circuit a signal to the transponder.

\* \* \* \* \*